United States Patent [19]

Watanabe et al.

[11] 4,261,745
[45] Apr. 14, 1981

[54] METHOD FOR PREPARING A COMPOSITE METAL SINTERED ARTICLE

[75] Inventors: Tadao Watanabe; Mitsuo Ohhori; Akio Ohta; Yoshikazu Kondo, all of Kudamatsu, Japan

[73] Assignee: Toyo Kohan Co., Ltd., Tokyo, Japan

[21] Appl. No.: 974,521

[22] Filed: Dec. 29, 1978

[51] Int. Cl.³ .............................................. B22F 7/04
[52] U.S. Cl. .................................. 75/208 R; 75/200; 228/115; 228/116; 428/553
[58] Field of Search ........................ 156/232, 233, 249; 427/367, 133, 135; 75/208 R, 200, 221; 228/115, 116; 428/553

[56] References Cited

U.S. PATENT DOCUMENTS

| | | | |
|---|---|---|---|
| 2,342,037 | 2/1944 | Cremer | 427/133 |
| 3,364,089 | 1/1968 | Koubeck et al. | 156/232 |
| 3,506,500 | 4/1970 | Talmage | 75/208 R |
| 3,738,830 | 6/1970 | Kimura et al. | 75/214 |
| 3,886,637 | 6/1975 | Ellis et al. | 427/133 X |
| 3,982,934 | 9/1976 | Wentzell | 75/208 R |
| 3,994,784 | 11/1976 | Kapush | 204/6 |
| 4,032,335 | 6/1977 | Zapf | 75/208 R |
| 4,090,873 | 5/1978 | Takamura et al. | 75/208 R |

FOREIGN PATENT DOCUMENTS

| | | | |
|---|---|---|---|
| 1809112 | 6/1970 | Fed. Rep. of Germany | 427/133 |
| 2553007 | 6/1977 | Fed. Rep. of Germany | 427/133 |
| 53-41191 | 10/1978 | Japan | 156/232 |
| 882225 | 11/1961 | United Kingdom | 427/133 |

*Primary Examiner*—Richard E. Schafer
*Attorney, Agent, or Firm*—Wenderoth, Lind & Ponack

[57] ABSTRACT

A composite metal sintered article combining a metal shell which has been electroformed and/or electroless plated and/or vapor deposited, positioned inside or outside of a metal sintered compact. A method of making the composite metal sintered article using both a powder metallurgy process and a surface treating process. This composite metal sintered article has excellent surface properties and high dimensional accuracy and is favorably used for many kinds of forming molds, dies and structural members, especially for press molds in making glassware.

9 Claims, 5 Drawing Figures

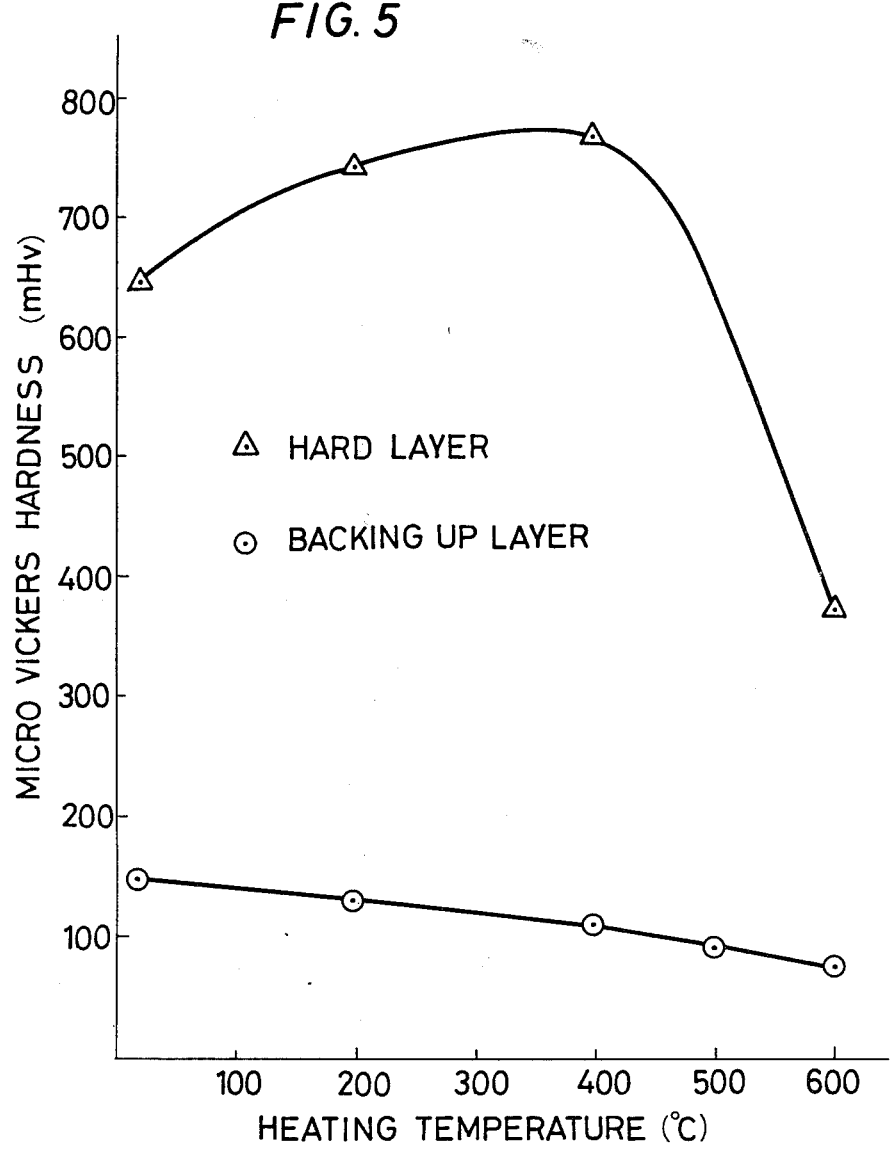

METHOD FOR PREPARING A COMPOSITE METAL SINTERED ARTICLE

BACKGROUND OF THE INVENTION

Sintered compacts obtained by powder metallurgy are widely used for various kinds of parts, dies, molds and structural members because articles of complex shape can be easily obtained with minimum machining, high yield and high productivity.

However, the uses of these compacts are limited. The reason for this is that the ordinary sintered material always contains pores and therefor is not equal to the conventional wrought material in strength, corrosion resistance, wear resistance and surface precision.

Particularly, articles which must have a high degree of dimensional precision and a high degree of surface finish must be treated by infiltration, liquid sintering or hot isostatic pressing. In addition, they must be machined and finished just as well as wrought materials. In such cases, the merits of powder metallurgy are not sufficiently realized.

One of the ways to improve the surface properties of sintered materials is concerned with plating. Actually, to improve the surface properties of sintered material, attempts have been made to apply the electroplating process. But, in this process, troubles remain which result in less corrosion resistance because the electrolyte infiltrates into the pores of the sintered material and is enclosed therein. Additionally, it is very difficult to get a mirror-finished surface.

SUMMARY OF THE INVENTION

This invention is intended to avoid the problem described above.

The object of this invention is to provide composite metal sintered articles for use in various kinds of forming molds, dies and structural parts, which have excellent dimensional accuracy and superior surface properties.

Another object of this invention is to provide novel means to manufacture the above articles, using the best features of the powder metallurgy process and electroforming and/or electroless plating and/or vapor depositing processes.

The composite metal sintered article can be prepared by either of the following two methods:

(1) A metal sintered compact, whose shape conforms to a master mold, is set on (see for examples FIGS. 1 and 2) or in (see for example FIGS. 3 and 4) that mold, which has been previously covered with a metal shell by electroforming and/or electroless plating and/or vapor deposition, and the metal sintered compact and the metal shell are combined into one by compressing and welding.

(2) After compacting metal powder into a shape which conforms to a master mold whose surface is covered with an electroformed and/or electroless plated and/or vapor deposited metal shell, the master mold is extracted from the metal powder compact which has combined with the metal shell, and then the composite metal powder compact is sintered.

The above articles are characterized by combining a metal shell formed by electroforming and/or electroless plating and/or vapor depositing, and a metal sintered compact.

The methods of this invention are especially suitable for making articles having a high degree of surface finish.

Other features and advantages of this invention will be apparent from the following description with reference to the accompanying drawings.

The drawings are for purpose of illustration only and are not intended as a definition of the limits of the invention.

BRIEF DESCRIPTION OF THE DRAWINGS

FIG. 5 is a graph showing the change of hardness of the metal shell as a function of temperature.

DETAILED DESCRIPTION OF THE INVENTION

For a more complete understanding of this invention the following embodiments are presented.

Figure 1:
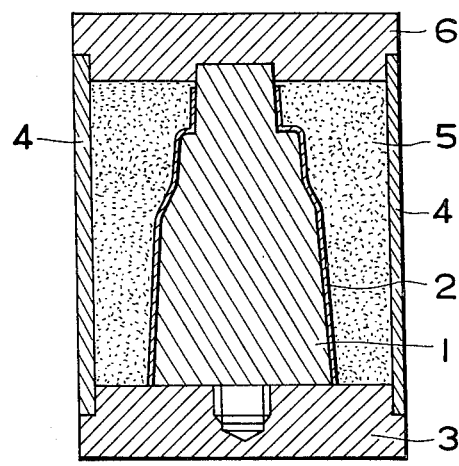
FIG. 1 and FIG. 2 are cross-sectional views illustrating packing of the metal powder at the time of making the composite metal sintered article having a metal shell inner side.
Figure 2:
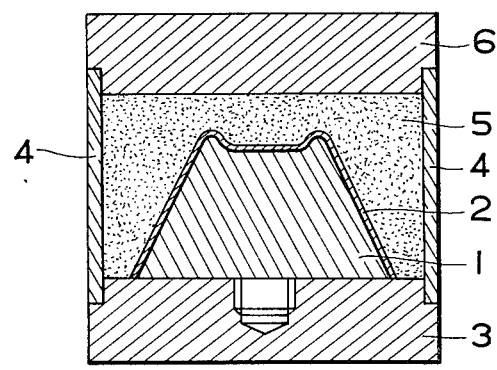

(a) In FIG. 1 and FIG. 2, one or more than one kind of desired metal or metal alloy (hereinafter they are called metals) is separately electroformed and/or electroless plated and/or vapor deposited (hereafter sometimes referred to as "coated" or "coating") in the required thickness onto the master mold 1 whose surface is finished to the desired accuracy. The outer surface of the metal shell 2 should be kept rather smooth by grinding after coating or by choosing appropriate coating conditions. After spreading a lubricant such as zinc stearate over the outer surface of the metal shell in order to subsequently permit easy extraction of the powder compact from the master mold coated with the metal shell, the coated master mold is screwed into and fixed on the lower stool 3.

In the cavity between the cylindrical rubber mold 4 which is fixed at the outer round of the lower stool 3 and the coated master mold, metal powder, alloy powder or their mixture (hereinafter they are generally called metal powder) 5 is packed and then, after the upper stool 6 is fixed, as a lid, on the cylindrical rubber mold 4 to make the assembly air-tight, the assembly is compressed at a pressure of 1–5 tons/cm$^2$ (7.14–35.7 tsi) by a hydrostatic press.

After compaction, only the metal powder compact is pulled out from the coated master mold and is sintered under suitable conditions for the compact. In this sintering the kind of powder and sintering conditions must be carefully selected so as not to cause shrinkage of the sintered compact, as mentioned later.

After roughening the outer surface of the metal shell, for example by shot blast working if necessary, so as to increase the bonding force between the metal shell and the sintered compact, the sintered compact is set back on the coated master mold which is still fixed on the lower stool 3. The metal sintered compact is again compacted using a hydrostatic press in the same way as for making the metal powder compact described above, and thus, the metal sintered compact and metal shell are combined into a composite article. The composite article is pulled out of the master mold, and can be put to practical use after light machining.

In the method described above, it is to be noted that nodules which sometimes form on the outer surface of the metal shell should be removed by grinding, but it is possible to prevent formation of the nodules, which will cause trouble during later extraction of the metal powder compact, by selecting suitable conditions for deposition and taking care to maintain the bath conditions.

Furthermore, it is to be noted that before recompressing the metal sintered compact, the outer surface of the metal shell should be made rough, for example by shot blast working, to increase the binding force between the sintered compact and the metal shell during recompressing the sintered compact. The rough surface of the metal shell can be formed not only by this mechanical method, but also by re-electroforming or re-electroless plating under suitable conditions.

The binding force can be increased by spreading an inorganic or organic adhesive on the binding surface.

The kind of metal powders used and the sintering conditions should be selected to prevent shrinkage of the compact during sintering. For instance, using only iron powder, the powder compact generally shrinks somewhat during sintering. Due to this shrinkage, the sintered compact cannot be accurately positioned on the coated master mold. In this case, by mixing at least 5% by weight of copper powder with the iron powder, the sintered compact can be "expanded", according to the amount of the copper, and is easily set completely on the coated master mold. Suitable copper contents range from 5% to 20% by weight, based on the weight of the iron.

The sintering conditions are not critical. For example, the compact of iron powder containing copper is heated at a temperature of 1150°-1250° C. (2102°-2282° F.) for 10-60 minutes under an inert atmosphere or reducing atmosphere.

There are no limitations on the materials used for the master mold. For example, aluminum, titanium and their alloys can be used for the master mold without any prior treatment thereof, and copper, its alloy and normal steel which are treated to be easily separated from the metal shell can also be employed. This treatment for copper and its alloy is performed by dipping the master mold in a 0.5% selenium dioxide solution for about 10 seconds, resulting in forming a thin oxide film on the surface of the master mold. As for normal steel, the treatment is performed by chromium plating on the surface of the master mold or by dipping it in a potassium dichromate solution (5 g/l) for one minute.

Non-metals that can be rendered conductive can also be employed for the master mold. However, stainless steel and chromium-plated steel are usually used as the material for the master mold, called the mandrel.

(b) In the method described above, one master mold is used for compacting the metal powder and recompacting the metal sintered compact.

To work better with this method, two master molds can be used, one of which has a very smooth surface for electroforming and/or electroless plating and/or vapor depositing, and the other of which is used for powder compaction. The latter, the master mold for compaction, does not need any special surface finishing because it is only necessary for the metal powder compact to be pulled out of it. Additionally, it can be made of a material which is cheaper and more easily machined, for instance normal steel and cast iron and the like.

The mold for powder compaction does not need to be the same size as the master mold for coating, for the reason mentioned hereinafter.

Referring now to this embodiment (b), using the same procedure as in embodiment (a), one or more than one kind of required metal or metal alloy is separately electroformed and/or electroless plated, and/or vapor deposited on the master mold to the necessary thickness, wherein the outer surface of the metal shell must have roughness, accomplished by choosing appropriate coating conditions.

The metal powder compact having a cavity therein is formed using another mold for powder compaction in the same way as embodiment (a), and is sintered under suitable conditions for that compact. In this case the mold for compaction can be made in anticipation of dimensional change during the sintering and the thickness of the deposit, so that there is no limitation on the kind of powder and the sintering conditions because of the dimensional change during sintering.

Setting this sintered compact onto the coated master mold, the sintered compact is recompressed. During recompression, the sintered compact is re-formed so as to enter among nodules on the rough surface of the metal shell and thus combine tightly with the metal shell. The master mold is then extracted from the sintered compact having a metal shell inside of it, and after the composite compact is lightly machined, it can be used for, for instance, a forming mold.

(c) In order to operate more effectively with this invention, the following method is proposed.

One or more than one kind of required metal or metal alloy is separately electroformed and/or electroless plated and/or vapor deposited on a master mold whose surface is finished to a high degree, wherein the appropriate coating conditions should be adopted to form nodules on the outside surface of the metal shell.

The metal powder compact is formed using this coated master mold as a mandrel, in such a way as described before with a hydrostatic press. During compaction the metal powder enters among the nodules on the surface of the metal shell, and the bonding force between the powder compact and the metal shell becomes stronger than that between the metal shell and the master mold, and subsequently the metal shell comes out easily with the powder compact. After the powder compact, which has thus combined with the metal shell, is pulled out of the master mold, it is sintered under suitable conditions for the compact. The composite metal sintered article is utilized after being lightly machined.

In this example the kind of powder and its sintering conditions should be selected carefully so as not to break the bond between the metal powder compact and the metal shell by means of their different degrees of heat expansion during sintering.

However, the metal shell may be softened by heat during sintering, so this method may be limited in its areas of application.

(d) To realize a further superiority of this invention, the following embodiment will be presented.

The special object of this embodiment is to provide a complex sintered article which has a better wear resistance and strength at room temperature and also at high temperature.

In the same way as above, one or more than one kind of metal or metal alloy is separately electroformed and/or electroless plated and/or vapor deposited on the master mold, but in a manner such that the metal shell is composed of a relatively thin layer which has good wear resistance and a relatively thick layer which has comparatively low hardness.

The details of this embodiment (d) will be shown below by the same procedure as in embodiments (a), (b) and (c).

The thin metal layer which has a good wear resistance (hereafter called hard layer) is electroformed and/or electroless plated and/or vapor deposited on the master mold. This hard layer is required to have a high wear resistance because it will eventually contact the material which is to be worked (when the composite metal sintered article is used as a die), formed (when the composite metal sintered article is used as a mold) or rubbed (when the composite metal sintered article is used as a wear-resistant part). As the wear resistance is nearly proportional to the hardness, the hard layer should have a high hardness, e.g. at least about 500 in micro Vickers hardness. Further, if the material which is to be worked or formed is worked or formed at a high temperature, for instance as is melted glass, the micro Vickers hardness of the hard layer should not drop below about 500 under a mold operating temperature of 300°–400° C. (572°–752° F.).

The composition and the coating conditions of the electroforming and/or electroless plating and/or vapor deposition should be selected in view of the above description.

Some examples of the hard layer are as follows: Cr, Mo, Ni-P, Ni-Co, Ni-W, Ni-Fe, Ni-Mo, Cr-Mo, Co-P, Ni-Co-P, Fe-P, Co-W, Fe-W, Ni-Co-B, Ni-Fe-P, Ni-W-P, Co-W-P, which are electroformed or electroless plated, and Cr, Mo, Nb, Ni, Ti, V, W, Zr, Cr-Ni, Ti-V which are vapor deposited.

The favorable thickness of the hard layer is from 20 $\mu$m to 200 $\mu$m. The reason for this is that it takes a longer time to obtain a thicker layer, and a thicker layer easily develops cracks due to high internal stress; and a thinner layer is easily damaged during the operation due to repeated wear, and the economical advantage will be lost by decreasing the number of polish adjustments.

It is important to overcoat a softer and thicker metal layer (hereinafter called tough layer or backing layer) on this hard layer, since the hard layer is thin and brittle, and is in danger of breaking during its extraction from the master mold and subsequent working thereof. It is therefore essential to reinforce the hard layer with a relatively tough layer.

If the hardness of the tough layer is too high, it will become brittle and its toughness will be spoiled, resulting in loss of its reinforcing effect. Therefore, the hardness of the tough layer is preferably not over about 400 in micro Vickers hardness.

Conversely, if the hardness of the tough layer is too low, it is easily deformed, reducing its effect. So the hardness of the tough layer is preferably at least 70 in micro Vickers hardness.

The thickness of the backing layer, i.e. the relatively tough layer, is favorably over about 500 $\mu$m, otherwise, it does not produce a sufficient effect.

Some examples of the metals or alloys which constitute the backing layer are Ni, Nu, Fe and their alloys. These are electroformed with higher current density, current efficiency and power efficiency, so even if electroformed thickly, their workability and economical advantage will not be reduced. Further, these metals are easily electroformed without forming cracks due to low internal stress.

Using this multi-layered metal shell, dies, molds and other parts are formed in the same way as described in embodiments (a), (b) and (c).

In this method the formation of the hard layer can be done by a vapor deposition process, for instance, an ion plating process, which has the same faculty as electroforming or electroless plating.

The special feature of this method is that the metal shell has excellent wear resistance at high temperature, and is not easily broken, because the thin, hard layer, which has high wear resistance, is reinforced with the thick, relatively soft layer which has high ductility.

Figure 3:
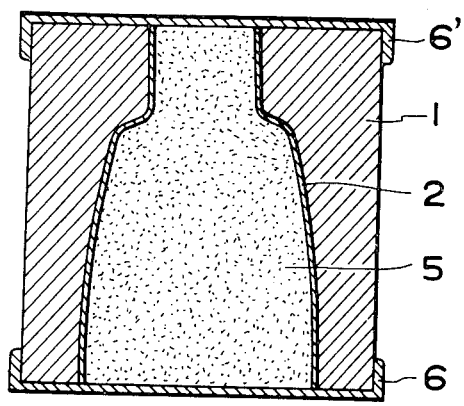
FIG. 3 and FIG. 4 are cross-sectional views showing packing of the metal powder at the time of making the composite metal sintered article having a metal shell outer side.
Figure 4:
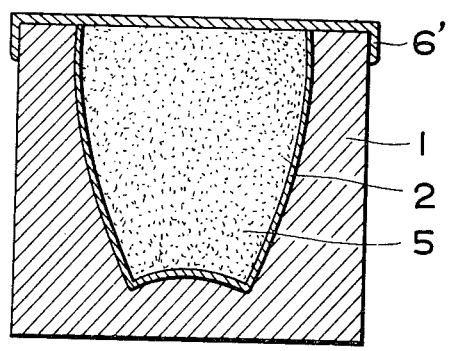

(e) Referring now to FIG. 3 or FIG. 4, relating to an article wherein the outer surface of the metal sintered compact is covered with a metal shell, electroforming and/or electroless plating and/or vapor depositing one or more than one desired metal or metal alloy can be carried out to form the metal shell 2 on the inner surface of the master mold 1, of which the inner surface is finished to the desired accuracy. As in embodiment (a), the inner surface of the metal shell should be kept smooth, and is spread with a lubricant such as zinc stearate in order to permit easy extraction of the powder compact from the master mold covered with the metal shell.

One opening of the master mold is closed with elastic plate 6, for example, a rubber plate, and metal powder 5 is packed in the remaining opening, after which this opening is closed in the same way as the other opening with elastic plate 6'. After fixing the elastic plates 6 and 6' to the master mold 1 to form an air-tight assembly, the powder 5 in the mold is compacted with a hydrostatic press at a pressure of 1–5 tons/cm$^2$ (7.14–35.7 tsi).

If necessary, the decrease of the compact volume by the first compression can be compensated for by repeating the same operation as described above, repacking powder into the void between the compact and elastic plate, and then recompressing.

After this the powder compact is pulled out from the coated mold and sintered. In this sintering the kind of powder and its sintering conditions should be selected so that the compact is not expanded. The reason for this is the same as the reason given above in embodiment (a) for selecting the kind of powder and sintering conditions so as not to cause shrinkage of the sintered compact.

Making the inner surface of the metal shell rough by, for example, shot blast working, the sintered compact is inserted into the master mold and is recompressed in the same way as mentioned above in connection with FIGS. 1 and 2, to combine the metal shell and the sintered compact.

The recompression of the sintered compact can be easily done because the sintered compact is porous and consequently is compressible.

The composite sintered compact is then extracted out of the master mold, and, after lightly machining it, can be put to a final use.

To work better with this method, use can be made of two master molds as described above in embodiment (b).

Further, after packing the metal powder into the master mold which has a metal shell inside and compacting, the metal powder compact with combined metal shell can be sintered together.

In the present invention, including all of the embodiments described above, any kind of metal shell which can be electroformed and/or electroless plated and/or vapor deposited can be used.

For example, in electroforming, Ni, Cu, Fe, Co, Ag, Cr, Pb, Zn, Al and their alloys can be used. Also, a composite electroformed metal shell, in which filaments or particles are dispersed, can be used.

Typical examples of electroforming conditions are as follows:

| | | |
|---|---|---|
| (1) | Ni electroforming | |
| | Ni sulfamate | 350–450 g/l |
| | Boric acid | 30 g/l |
| | Sodium laurylsulfate | 0.4–0.6 g/l |
| | pH | 3.5–5 |
| | Bath temperature | 40–60° C. |
| | Current density | 2.5–30 A/dm$^2$ |
| (2) | Cu electroforming | |
| | Copper sulfate | 220–260 g/l |
| | Sulfuric acid | 60–75 g/l |
| | Bath temperature | 20–30° C. |
| | Current density | 2–5 A/dm$^2$ |
| (3) | Fe electroforming | |
| | Iron (II) chloride | 300–525 g/l |
| | Potassium chloride | 115–335 g/l |
| | Surface-active agent | 0.5–1 g/l |
| | pH | 1.5–2.5 |
| | Bath temperature | 70–105° C. |
| | Current density | 5–10 A/dm$^2$ |
| (4) | Co electroforming | |
| | Cobalt sulfate | 400–600 g/l |
| | Sodium chloride | 10–20 g/l |
| | Boric acid | 40–50 g/l |
| | pH | 5–6 |
| | Bath temperature | room temperature |
| | Current density | 4–18 A/dm$^2$ |
| (5) | Ag electroforming | |
| | Silver cyanide | 3.7–5.2 g/l |
| | Potassium cyanide | 75–90 g/l |
| | Bath temperature | 20–30° C. |
| | Current density | 1.5–2.5 A/dm$^2$ |
| | Bath voltage | 4–6 V |
| (6) | Cr electroforming | |
| | Chromium trioxide | 50–500 g/l |
| | Sulfuric acid | 100 g/l |
| | Bath temperature | 45–55° C. |
| | Current density | 12–20 A/dm$^2$ |
| (7) | Pb electroforming | |
| | Lead silicofluoride | 120–140 g/l |
| | Silicofluoride acid | 55–65 g/l |
| | Gelatin | 0.5 g/l |
| | Bath temperature | 35–40° C. |
| | Current density | <1.2 A/dm$^2$ |
| | Bath voltage | 0.1–0.2 V |
| (8) | Zn electroforming | |
| | Zinc chloride | 135 g/l |
| | Sodium chloride | 230 g/l |
| | Aluminum chloride | 22.5 g/l |
| | pH | 3.0–4.0 |
| | Bath temperature | 20–35° C. |
| | Current density | 1–15 A/dm$^2$ |
| (9) | Ni—Co electroforming | |
| | Nickel sulfate | 240–300 g/l |
| | Nickel chloride | 30–45 g/l |
| | Boric acid | 30–40 g/l |
| | Nickel formate | 10–20 g/l |
| | Cobalt sulfate | 2–3 g/l |
| | Ammonium sulfate | 1–2 g/l |
| | pH | 4–5 |
| | Bath temperature | 45–55° C. |
| | Current density | 4–8 A/dm$^2$ |
| (10) | Cu—Zn electroforming | |
| | Copper cyanide | 70–100 g/l |
| | Zinc oxide | 3–9 g/l |
| | Sodium cyanide | 90–135 g/l |
| | Sodium hydroxide | 45–75 g/l |
| | Bath temperature | 75–90° C. |
| | Current density | 3–16 A/dm$^2$ |

In electroless plating, for example, Ni, Co, Cu, Ag and their alloys are available for the metal shell.

Typical examples of electroless plating conditions are as follows:

| | | |
|---|---|---|
| (1) | Ni electroless plating | |
| | Nickel chloride | 50 g/l |
| | Sodium citrate | 10 g/l |
| | Sodium hypophosphite | 10 g/l |
| | pH | 4–6 |
| | Bath temperature | 85–93° C. |
| (2) | Co electroless plating | |
| | Cobalt sulfate | 0.08 mol/l |
| | Sodium hypophosphite | 0.2 mol/l |
| | Sodium tartrate | 0.5 mol/l |
| | Boric acid | 0.5 mol/l |
| | pH | 9 |
| | Bath temperature | 85–95° C. |
| (3) | Cu electroless plating | |
| | Copper sulfate | 0.03 mol/l |
| | EDTA | 0.04 mol/l |
| | Formalin | 0.23 mol/l |
| | Sodium hydroxide | 0.1 mol/l |
| | 2,9-Dimethyl-1,10-Phenantholine (Neocuproine) | 30–100 mg/l |
| | Bath temperature | 60° C. |
| (4) | Ag electroless plating | |
| | Silver solution | |
| | Silver nitrate | 60 g |
| | Ammonia water (28%) | 60 ml |
| | Water | 1 liter |
| | Reducing solution | |
| | 4% Formalin | 65 ml |
| | Water | 1 liter |
| | Bath temperature | room temperature |
| (5) | Ni—Co—P electroless plating | |
| | Nickel sulfate | (0.1 − X) mol/l |
| | Cobalt sulfate | X mol/l |
| | Sodium citrate | 0.2 mol/l |
| | Ammonium sulfate | 0.5 mol/l |
| | Sodium hypophosphite | 0.2 mol/l |
| | pH | 9 |
| | Bath temperature | 90° C. |
| | mol ratio X = CoSO$_4$/(NiSO$_4$ + CoSO$_4$) | |

In vapor deposition, for example, Cr, Mo, W, Zr, Ni, Cu-Ni and Ni-Cr are available for the metal shell. The conditions employed for vapor deposition are well-known and used by those in the art.

The thickness of the metal shell can be selected according to purpose and production cost. In this invention, the thickness should be over 50 μm because a thinner shell is easily damaged during later handling and operation. The upper limit of the thickness should be 10 mm, more favorably 5 mm, since it takes a longer time to obtain a thicker shell and the production cost will increase, and further, the significance of reinforcing with an economical powder metallurgy process will be lost.

The metal powder for the sintered compact is not limited by any example in this description. Iron powder, copper powder, their alloy, stainless steel powder and mixtures thereof exemplify the metal powders which can be used.

The sintering conditions are not special. Conditions which are usually employed in powder metallurgy in general are adopted in accordance with the metal powder used. Examples of the sintering conditions are shown below.

| Material | Temp. °F. | Time (minutes) |
|---|---|---|
| Bronze | 1400–1600 | 10–20 |
| Copper | 1550–1650 | 12–45 |
| Brass | 1550–1650 | 10–45 |
| Iron, Iron-Graphite | 1850–2100 | 8–45 |
| Nickel | 1850–2100 | 30–45 |

-continued

| Material | Temp. °F. | Time (minutes) |
|---|---|---|
| Stainless steel | 2000-2350 | 30-60 |

Compaction of the metal powder is carried out with a hydostatic press at a pressure of 1-5 tons/cm$^2$, and recompaction of the sintered compact and metal shell is carried out with the same press at a pressure of 1.5-6 tons/cm$^2$. If the pressure is under 1 ton/cm$^2$, the strength of the powder compact is too low and it is difficult to handle the compact. On the other hand, using a pressure over 6 tons/cm$^2$ requires a larger apparatus and consequently the economic advantage will be lost.

The top and/or bottom side of the metal shell can be welded or soldered to the metal sintered compact, for example by placing a brazing filler metal powder or foil between the metal shell and metal sintered compact and, after compressing them together, heating them to solder the metal shell and metal sintered compact.

The composite metal sintered articles prepared by this invention have the following superior features.

(1) The outer surface or inner surface of the composite metal sintered article takes on the same surface pattern as the master mold which is machined into the desired shape and finished to the required surface, because of the high ability for transferring the electroforming, electroless plating or vapor deposit. Therefore, any complex shaped article can be manufactured without any special after-working so long as the master mold can be extracted. Besides, a material which has a high degree of surface finish can be easily obtained with the smallest dimensional tolerances.

(2) The wear resistance, corrosion resistance and heat resistance of the surface of the composite metal sintered article which is formed by electroforming and/or electroless plating and/or vapor depositing is largely improved by choosing the kind of coated metal and its thickness according to purpose.

(3) Products can be obtained of high dimensional accuracy because the size and pattern of the outer surface of inner surface of the products are the same as the inner surface or outer surface of the master mold, respectively.

(4) By choosing the kind of metal powders and their sintering conditions, it is possible to make sintered compacts which have special features. For example, mixing copper or copper alloy with iron powder, using the pre-alloyed powder to form the compact or infiltrating the copper or copper alloy after making the compact, the strength and heat conductivity are easily changed in proportion to their respective amounts.

Further, making use of the pores in the sintered compact, the cooling effect of the compact will be improved by supplying water continuously to the compact (for instance, in a glass-forming mold), and on the other side of the metal shell the lubricating effect will also be improved by holding oil in it (for instance, oil impregnated bearings and bushings).

(5) The articles will be produced economically on a large scale with little material loss even in the case of complex shapes, and without any special skill required in conventional machining or casting processes.

It is hardly possible to obtain these superior features by the conventional method of electroplating on the sintered compact, wherein in plating on the sintered compact, a pretreatment, which fills up the pores on the surface of the compact, is required to prevent the electrolyte from penetrating into the compact. Further, it is very hard to completely fill up these pores, and, even if the pores are completely filled up, it is very hard to obtain a mirror-finished surface without mechanical grinding and polishing after plating. Besides, peeling of the plated layer and formation of cracks in the corner areas occur easily when the article is loaded or placed under high temperature stress.

Generally speaking, in electroplating the surface brightness decreases as the thickness increases, even if plating on a highly finished surface. On the other hand, in this invention, working the surface of a master mold to a high degree of finish, the same surface as the master mold can be obtained and the brightness of the surface is not spoiled even if the coating thickness increases.

Of course, in plating it is possible to get a bright surface by adding some spcial reagent to the electrolyte. But, in this case, the reaction products of the additive will be included in the plated layer and will exert a harmful effect on the electrodeposition. While, by this invention, the bad effect of the reaction products does not arise because it is not necessary to add such a reagent in order to obtain a bright plating.

Further, using the machined wrought material instead of the sintered compact, it will be very difficult to get a better weldability to the metal shell as is done by this invention, because the wrought material has no recompressibility.

The present invention will be further understood by reference to the following examples, which are not intended to limit the invention.

EXAMPLE 1

A glass-forming mold was produced by the following method.

A Ni-P alloy was electroformed in a thickness of about 0.1 mm on a stainless steel master mold which is sculptured in a leaf pattern on the side surface and is finished to a high degree. The electroforming conditions are shown in Table 1.

Subsequently, changing the electroforming bath, Ni was further electroformed on it in a thickness of about 0.5 mm. The electroforming conditions are shown in Table 2.

A mixture of Cu and Fe powder (15 weight % Cu) was compacted by a hydrostatic press at a pressure of 3 tons/cm$^2$ (21.4 tsi) in the same way as described above in embodiment (a).

The mandrel for powder compaction is about the same shape as the master mold for electroforming and is larger by about 0.8 mm in diameter than the coated master mold.

After sintering the powder compact at a temperature of 1150° C. (2102° F.) for 30 minutes in a dry hydrogen atmosphere, the sintered compact was put onto the coated master mold and compressed with the hydrostatic press at a pressure of 3.5 tons/cm$^2$ (25 tsi) in the same way as for powder compaction, and was thus combined with the metal shell.

The sintered compact was the electroformed Ni and Ni-P shell inside was extracted out of the master mold, thus obtaining the glass-forming mold, of which the inside consists of a fine lining with a highly finished surface.

The hardness of the hard layer (Ni-P alloy) of the metal shell is 650 in micro Vickers hardness and that of the backing layer (Ni) is 150 in micro Vickers hardness.

The change in hardness of the hard layer with changing temperature is shown in FIG. 5. It is obvious that the hardness, which roughly indicates wear resistance, does not decrease until the temperature increases up to 500° C. (932° F.).

This mold can be used favorably for every kind of mold used at high temperature.

Using this mold for making glassware, the life of the mold was the same as or longer than a conventional mold which has been manufactured by machining wrought SUS 309 stainless steel. Further, the manufacturing cost for this mold is less than for the conventional one.

TABLE 1

Ni—P Electroforming Conditions

| | | |
|---|---|---|
| Bath Composition | Nickel sulfate | 300 g/l |
| | Ni—P electrolyte | 200 ml/l |
| | (Made by OKUNO SEIYAKU Co., Ltd.) | |
| Current Density | 5 A/dm² | |
| Bath Temperature | 65° C. (149° F.) | |
| pH | 1.5–2.0 | |
| Time | 5 hrs. | |

TABLE 2

Ni Electroforming Conditions

| | | |
|---|---|---|
| Bath Composition | Nickel sulfamate | 450 g/l |
| | Boric acid | 30 g/l |
| | Sodium laurylsulfate | 0.5 g/l |
| Current Density | 15 A/dm² | |
| Bath Temperature | 50° C. (122° F.) | |
| pH | 4.0 | |
| Time | 8 hrs. | |

EXAMPLE 2

A Ni-Co alloy was electroformed in a thickness of 0.3 mm on a chromium-plated steel master mold which had cut patterns and was finished to a high degree. The electroforming conditions are shown in Table 3. After removing nodules, formed on the outer surface of the metal shell, by grinding, the metal shell was spread with zinc stearate dissolved in carbon tetrachloride.

Using this electroformed master mold as a mandrel, Cu prealloyed Fe powder (30 weight % Cu) was compacted with a hydrostatic press at a pressure of 2.5 tons/cm² (17.9 tsi) in the same way as described in Example 1.

Only the powder compact was extracted from the electroformed master mold, and was subsequently sintered at a temperature of 1,200° C. (2192° F.) for 15 minutes in dry hydrogen. This sintered compact was again put onto the electroformed master mold, and after being recompressed in the same way as in powder compaction, at a pressure of 3 tons/cm² (21.4 tsi), with the hydrostatic press, the sintered compact together with the metal shell was pulled out of the master mold.

Thus, a glass-forming mold having a bright Ni-Co alloy shell and also having a high corrosion resistant and high heat resistant lining inside was obtained.

TABLE 3

Ni—Co Electroforming Conditions

| | | |
|---|---|---|
| | Nickel sulfate | 240 g/l |
| | Nickel chloride | 25 g/l |
| | Boric acid | 30 g/l |

TABLE 3-continued

Ni—Co Electroforming Conditions

| | | |
|---|---|---|
| Bath Composition | | |
| | Nickel formate | 15 g/l |
| | Cobalt sulfate | 2.6 g/l |
| | Ammonium sulfate | 1.5 g/l |
| Current Density | 8 A/dm² | |
| Bath Temperature | 50° C. (122° F.) | |
| pH | 4.7 | |
| Time | 6 hrs. | |

EXAMPLE 3

A Ni-W alloy was electroformed in a thickness of about 0.5 mm on the inner side of a cylindrical master mold, the inside of which has been tapered and polished. The electroforming conditions are shown in Table 4.

SUS 304 stainless steel powder was filled in the inside of the electroformed master mold, and after compacting as described in Example 1 with a hydrostatic press at a pressure of 2.5 tons/cm² (17.9 tsi), the powder compact combined with the metal shell was extracted out of the master mold and subsequently sintered at a temperature of 1200° C. (2192° F.) for 20 minutes in a vacuum.

Thus, a composite sintered article which has a bright outside Ni-W lining was obtained.

TABLE 4

Ni-W Electroforming Conditions

| | | |
|---|---|---|
| | Nickel chloride | 50 g/l |
| | Sodium tungstate | 50 g/l |
| Bath Composition | | |
| | Calcium phosphate | 200 g/l |
| | Ammonium oxalate | 30 g/l |
| | Ammonium citrate | 20 g/l |
| Current Density | 5 A/dm² | |
| Bath Temperature | 60° C. (140° F.) | |
| pH | 9.3 | |
| Time | 12 hrs. | |

EXAMPLE 4

Ni was electroformed for about 15 hrs. to a thickness of about 1 mm on a chromium-plated steel master mold which had a simple conical shape and was finished to a mirror-finished surface. The electroforming conditions are as previously shown in Table 2.

In the same way as described in Example 1, a composite metal sintered mold was obtained. And, as the shape of the mold was simple and flat, the Ni metal shell and the sintered compact were soldered with brass brazing filler metal at the top and the bottom of the mold.

Using this mold for forming glassware, it is proved that the mold worked well, without any trouble.

EXAMPLE 5

Silver was deposited on an ABS (Acryl-Butadiene-Styrene) resin master mold which had a simple conical shape and was finished to a mirror finished surface. The silver electroless plating was carried out under the conditions in Table 5.

TABLE 5

Ag Electroless Plating Conditions

| | | |
|---|---|---|
| | Silver nitrate | 3.5 g |
| | Sodium hydroxide | 2.5 g |
| | Water | 60 cc |
| Bath Composition | Ammonia water:add until the | |

TABLE 5-continued

| Ag Electroless Plating Conditions | |
|---|---|
| | precipitation is resolved |
| | Grape sugar (45g/1000 cc):add until the silver is deposited |
| Bath Temperature | 25° C. (77° F.) |

The ABS resin master mold which had been rendered conductive with a silver film was used for the master mold, and a composite metal sintered article was made in the same way as described in Example 1.

What is claimed is:

1. A method for preparing a composite metal sintered article, comprising
    coating a polished inner or outer surface of a master mold with a metal shell by electroforming and/or electroless plating and/or vapor deposition,
    bringing a metal powder which does not shrink during sintering into contact with the coated surface of the master mold,
    compressing the metal powder to form a powder compact,
    removing the powder compact from the coated master mold and sintering the powder compact,
    roughening the surface of the metal shell, which is still on the master mold,
    placing the sintered compact back into or onto the master mold coated with the roughened metal shell,
    compressing the sintered compact in contact with the coated master mold, and
    removing the sintered compact and the metal shell from the master mold in the form of a composite metal sintered article.

2. A method for preparing a composite metal sintered article, comprising
    coating a polished inner or outer surface of a first master mold with a metal shell by electroforming and/or electroless plating and/or vapor deposition,
    bringing a metal powder into contact with a sound master mold having about the same shape as the first master mold,
    compressing the metal powder to form a powder compact,
    removing the powder compact from the second master mold and sintering the powder compact,
    placing the sintered compact into or onto the first master mold whose metal shell coating is roughened,
    compressing the sintered compact in contact with the coated first master mold, and
    removing the sintered compact and the metal shell from the master mold in the form of a composite metal sintered article.

3. A method for preparing a composite metal sintered article, comprising
    coating a polished inner or outer surface of a master mold with a metal shell by electroforming and/or electroless plating and/or vapor deposition, roughening the surface of the metal shell,
    bringing a metal powder into contact with the roughened, surface of the metal shell, said metal powder and said metal shell having substantially the same degree of expansion during sintering,
    compressing the metal powder to form a powder compact,
    removing the powder compact and metal shell from the master mold in the form of a composite metal article, and
    sintering the composite metal article to form a composite metal sintered article.

4. A method as claimed in claim 1, 2 or 3 wherein the top and/or bottom side of the metal shell is welded or soldered to the metal sintered compact 3.

5. A method as claimed in claim 1 or 2, wherein a solder powder or foil is placed between the metal shell and the sintered compact or powder compact, and after the compressing step the metal shell and the sintered compact are soldered by heating.

6. A method as claimed in claim 1, 2 or 3, wherein the metal shell is coated onto the master mold so as to form a metal shell consisting of a first metal layer which is hard and wear-resistant, and a second metal layer which is thicker and softer than said first metal layer.

7. A method as claimed in claim 1, 2 or 3, wherein the metal shell has a thickness of greater than 50 $\mu$m.

8. A method as claimed in claim 1, 2 or 3, wherein the metal shell has a thickness of at least 500 $\mu$m.

9. A method as claimed in claim 1, 2 or 3, wherein an inorganic or organic adhesive is placed between the metal shell and the powder compact.

* * * * *